(12) United States Patent
Weichholdt

(10) Patent No.: US 7,063,613 B2
(45) Date of Patent: Jun. 20, 2006

(54) COMBINE WITH STRAW CHOPPER

(75) Inventor: Dirk Weichholdt, Sarreguemines (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/428,375

(22) Filed: May 2, 2003

(65) Prior Publication Data

US 2004/0029624 A1 Feb. 12, 2004

(51) Int. Cl.
*A01F 12/40* (2006.01)

(52) U.S. Cl. .................................................. 460/112

(58) Field of Classification Search ............... 460/112, 460/73, 78, 83; 56/504
See application file for complete search history.

(56) References Cited

U.S. PATENT DOCUMENTS

| 3,350,017 | A | * | 10/1967 | Howell et al. | 239/660 |
| 3,670,739 | A | * | 6/1972 | Rowland-Hill | 460/66 |
| 4,056,107 | A | | 11/1977 | Todd et al. | 130/27 |
| 4,646,757 | A | * | 3/1987 | Schmitt et al. | 460/112 |
| 4,669,489 | A | * | 6/1987 | Schraeder et al. | 460/112 |
| 4,884,993 | A | * | 12/1989 | Hemker et al. | 460/14 |
| 6,251,009 | B1 | | 6/2001 | Grywacheski et al. | 460/112 |
| 6,547,169 | B1 | * | 4/2003 | Matousek et al. | 239/661 |

FOREIGN PATENT DOCUMENTS

| DE | 28 15936 | | 4/1978 |
| DE | 43 13 841 | | 7/1994 |
| DE | 195 05 148 | | 2/1995 |
| EP | 0595382 A1 | * | 5/1994 |
| EP | 0 727 135 A1 | | 8/1996 |
| FR | 1 487 197 | | 6/1967 |

* cited by examiner

Primary Examiner—Árpád Fábián Kovács

(57) ABSTRACT

A combine comprising an axial separator having an outlet for directing crop material to a rotatively driven discharge beater. The discharge beater is adjacent to the outlet of the axial separator and is aligned to propel crop material discharged from the axial separator into a straw chopper. There is a straw guiding device between the outlet of the discharge beater and the inlet to the straw chopper. The straw guiding device comprises at least one flap, which is supported so that it can pivot at its end facing the discharge beater and which can pivot between a first chopping position, in which it guides the crop material into the straw chopper, and a second position for laying long straw, in which it guides the crop material onto the ground.

13 Claims, 2 Drawing Sheets

COMBINE WITH STRAW CHOPPER

FIELD OF THE INVENTION

The present invention is directed to a combine having a discharge beater that is aligned to propel crop material discharged from an axial separator into a straw chopper wherein a straw guiding means is arranged between the outlet of the beater and the inlet to the straw chopper.

BACKGROUND OF THE INVENTION

In DE 43 13 841 A the beater is used to guide crop residue away from an axial separator and feed it to a straw chopper. For improving the lateral distribution of the crop residue, an adjustable straw guiding element is provided between the outlet of the beater and the inlet to the straw chopper. The embodiments of this publication used with an axial separator do not lay long straw on the ground. For an embodiment with a straw rocker, for which no beater is used, there is a pivoting intake panel, which is mounted on the lower end of the rocker and which outputs the straw into the straw chopper in one position and outputs the straw onto the ground before the straw chopper in its other position. Due to spatial restrictions, such an intake panel cannot be used on combines with axial separators and their associated beaters.

SUMMARY OF THE INVENTION

It is an object of the present invention to provide a combine with an axial separator and a beater, which allows problem-free switching between the operations of laying long straw and chopping.

It is proposed to hinge at least one flap of the straw guiding device at its end adjacent to the beater so that it can pivot between a position for laying long straw, in which the crop material is usually laid on the ground before the straw chopper, and the chopping position, in which the crop residue is fed to the straw chopper.

In this way, a compact design for the straw guiding device is obtained. The straw chopper can be rigidly attached to the frame of the combine, because movement between the position for laying long straw and the chopping position is eliminated.

In a preferred embodiment, the pivoting flap of the straw guiding device can pivot about a horizontal axis running perpendicular to the direction of travel of the combine. The crop residue can thus be deflected to a greater or lesser extent backwards or upwards and can be fed either into the straw chopper or onto the ground. However, if the axial separator outputs the crop residue in a lateral direction, the pivot axis of the flap could also extend in the direction of travel.

The straw guiding device preferably includes a straw guiding flap, which covers the inlet to the straw chopper in the position for laying long straw and which opens this inlet in the chopping position. Thus, in the position for laying long straw, the straw is blocked from entering into the straw chopper, while in the chopping position it is led unimpeded into the straw chopper. Here, the pivoting process is preferably realized such that the straw guiding flap pivots upwards and backwards when it is brought from the position for laying long straw into the chopping position. Its pivot axis is preferably behind and above the outlet of the beater, so that it represents a top and rear limit to the flow of crop residue. For better guiding of the crop residue, the straw guiding flap preferably has a concave curvature.

The element of the straw guiding device preferably includes a discharge flap, which is arranged at the downstream end of a discharge plate. The discharge plate surrounds a portion of the periphery of the beater. The goods leaving the discharge plate and the beater are thus discharged in a direction set by the position of the discharge flap. In a preferred embodiment, the discharge flap is lowered for laying long straw and correspondingly raised in the chopping position. Thus, the crop residue is discharged either diagonally backwards and downwards directly onto the ground or diagonally backwards and upwards into the inlet of the straw chopper.

On the inside of the discharge plate, there can be adjustable guiding runners for optimum adjustment to the lateral distribution of crop residue during both operations of laying long straw, i.e., for adjusting the swatch width, and also during chopping.

DETAILED DESCRIPTION

Figure 1:
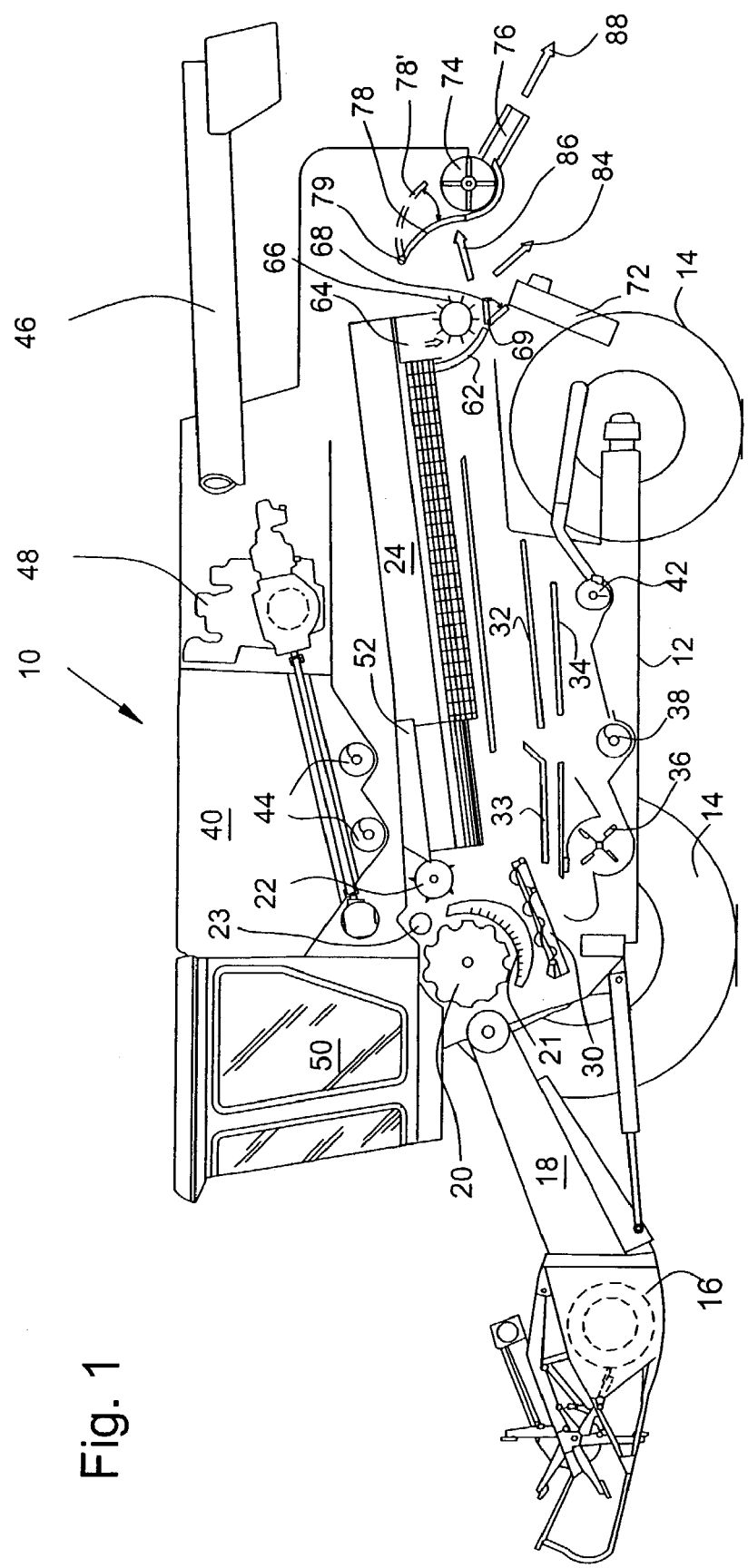
FIG. 1 is a semi-schematic side view of a combine having a straw chopper.
Figure 2:
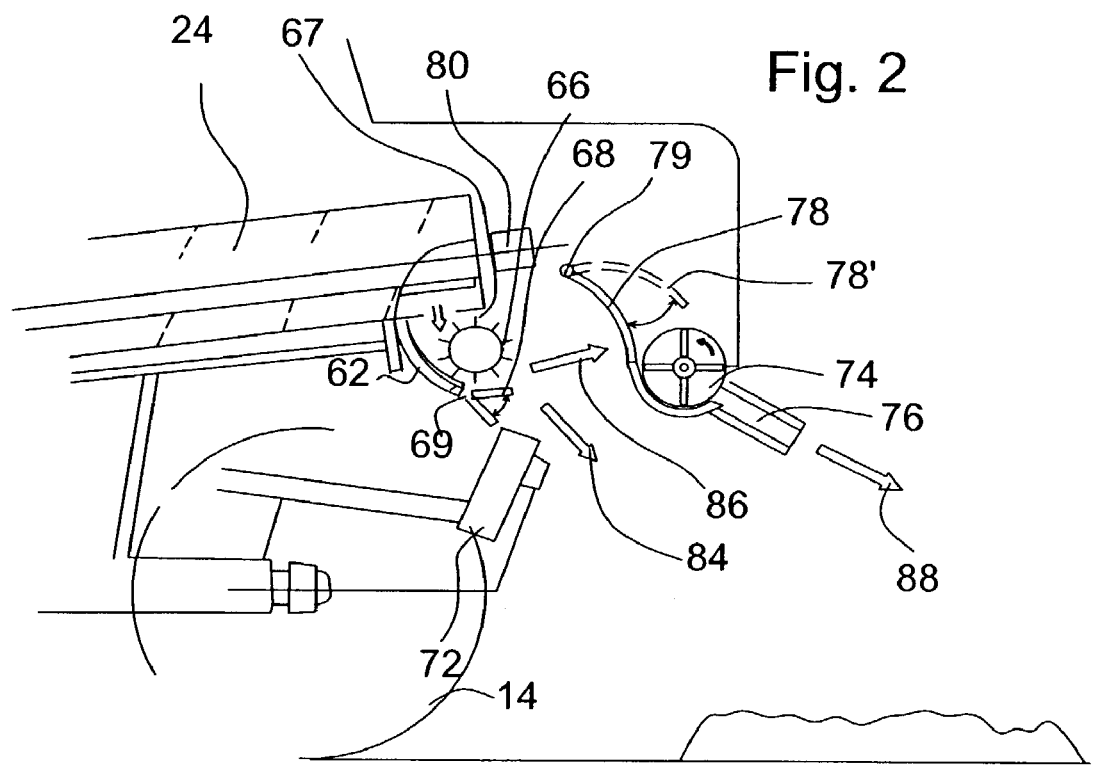
FIG. 2 is an enlarged section of FIG. 1.
Figure 3:
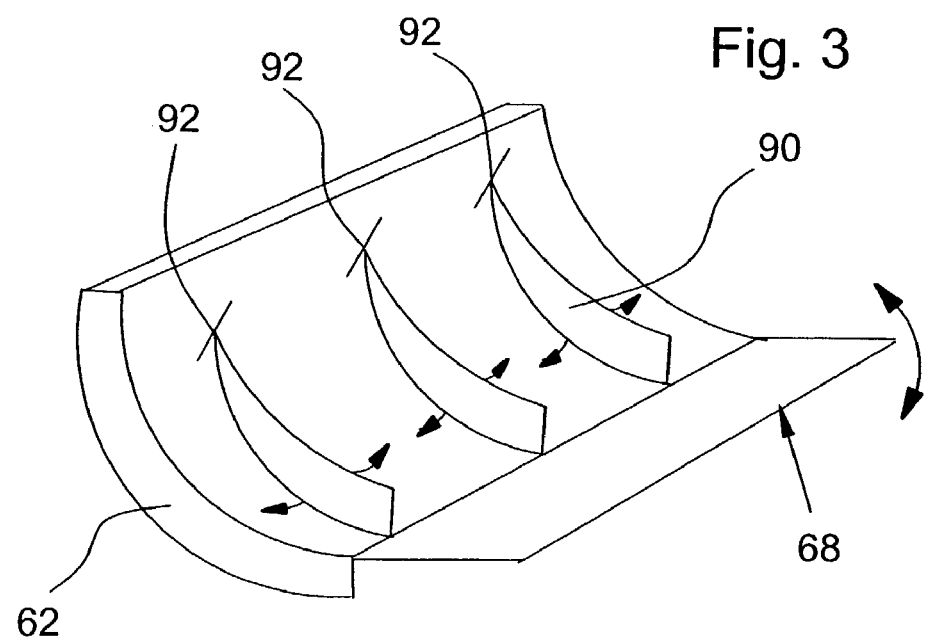
FIG. 3 is a top perspective view of the discharge plate beneath the beater.

FIG. 1 illustrates a self-propelled combine 10 having a support frame 12 and ground engaging wheels 14. The support frame 12 is supported on and is propelled by the wheels 14. The wheels 14 are rotated by a drive assembly (not-shown). The front of the combine 10 is provided with a crop harvesting assembly 16. The crop harvesting assembly 16 harvests the crop from the field and feeds it to a feeder house 18. The feeder house 18 conveys the harvested crop material upwardly and rearwardly to a threshing and separating assembly. The threshing and separating assembly comprises a transverse threshing cylinder 20 and an associated concave 21. It is also conceivable to eliminate the transverse threshing cylinder 20 and concave 21, and use an axial separator, which features an in-line threshing and separating section. In addition, the threshing and separating assembly can be arranged as a single axial separator or two (or more) axial separators arranged one after the other. The stripper roller 23 and the beater 22 with a feeding housing 52 together feed the threshed crop from the threshing cylinder 20 and the threshing concave 21 to the axial separator 24. The axial separator 24 is driven at its rear side by a gear 80 (see FIG. 2).

Grain and chaff, which are separated during the threshing process, fall onto at least one auger 30, which feeds both materials to a grain pan 33. In contrast, grain and chaff, which are output by the axial separator 24, fall onto a shaker pan 32 and then continue to the grain pan 33. The grain pan 33 advances the grain and chaff to a sieve 34, which is associated with a cleaning fan 36, in order to separate chaff from the grain. The cleanest grain is fed by means of a grain auger 38 to an elevator (not shown) that conveys the grain into a grain tank 40. A return auger 42 returns non-threshed crop portions by means of another elevator (not shown) back into the threshing process. The chaff is discharged at the rear side of the sieve device through a rotating chaff divider 72. The cleaned grain can be unloaded from the grain tank 40 through an unloading system with a cross auger 44 and an unloading auger 46.

The aforementioned systems are driven by means of an internal combustion engine 48, which is operated by an operator from an operator's cab 50. The different devices for threshing, conveying, cleaning, and separating are located within the side sheets of the support frame 12.

From the axial separator 24, threshed and separated crop residue (straw) is discharged downwards through a downward opening outlet 64 at the rear of the axial separator 24. Due to the effect of centrifugal force and the force of gravity, the crop residue falls onto a concave discharge plate 62. Above the discharge plate 62 there is a discharge beater 66, around whose periphery pushers 67 are distributed. The beater 66 is rotated counterclockwise in FIG. 1, about its longitudinal axis, which is transverse to the direction of travel. A discharge flap 68 that can pivot about a horizontal axis 69 which is transverse to the direction of travel is located beneath the axis of rotation of the beater 66 at the downstream end of the discharge plate 62. The discharge flap 68 can be pivoted about this axis 69 between a lower position for laying long straw illustrated in FIGS. 1 and 2, and an upper chopping position. The discharge flap 68 can be longer than what is shown in the drawings.

A straw chopper 74 is located at the rear of the combine 10 and is rotatively driven about a horizontal axis transverse to the direction of travel (counterclockwise in the figures). It includes a cylindrical body with chopping cutters, which are suspended on the body and which interact with stationary counter cutters in order to chop straw and to distribute the straw onto the field over approximately the cutting width of the combine 10 by means of a straw distribution hood 76. The straw distribution hood 76 is equipped with straw guiding vanes.

Between the beater 66 and the inlet to the straw chopper 74, there is a straw guiding flap 78 with a concave curvature in the form of a straw guiding sheet. The straw guiding flap 78 is located behind the beater 66 and above its axis of rotation and thus its outlet. It is pivoted at its front end about a transverse horizontal axis at pivot 79. The straw guiding flap 78 extends up to the inlet of the straw chopper 74. It can pivot between the position for laying long straw illustrated in FIGS. 1 and 2 and a chopping position, in which it pivots backwards and upwards and is illustrated by the dashed straw guiding flap 78'.

The discharge flap 68 and the straw guiding flap 78 act as the straw guiding device. They can be operated by hand or can be controlled remotely, preferably from the cab 50, by suitable motors. Separate mechanisms for manual and or motor-controlled pivoting of the discharge flap 68 and the straw guiding flap 78 can also be used. If the discharge flap 68 is located in the position for laying long straw, the straw is pushed from the beater 66 diagonally backwards and downwards and laid in a swath. It follows the path illustrated by the arrow 84. Straw that may have been pushed backwards bounces against the straw guiding flap 78, is deflected downwards, and is also led into the swath.

In contrast, if the discharge flap 68 is pivoted upwards and the straw guiding flap 78 is pivoted upwards both into the chopping position, indicated by 78', the straw is led from the beater 66 along the discharge flap 68 and pushed upwards and backwards. The straw follows the path indicated by the arrow 86, bounces against the concave straw guiding flap 78 and is deflected downwards by the flap so that it is led into the inlet to the straw chopper 74, which lays it on the field in the direction of arrow 88. For both the operation of laying long straw and also for chopping, the chaff distributor 72 leads the chaff into the straw flow, so that the straw and chaff are laid together in the swath or distributed across the width of the combine 10.

The discharge plate 62 is equipped with adjustable guide vanes 90 on its inner side facing the beater 66. The guide vanes 90 are fixed to the discharge plate 66 so that their front ends can pivot about axes 92 running perpendicular to the direction of straw flow. In a simple embodiment, they can be adjusted and blocked by hand. In another embodiment, they can be moved by a common motor or by several motors allocated to the individual guide vanes 90. The motors can be operated by hand by the operator in the cab 50. However, there can also be a sensor (or several sensors), which detects the width of the straw distribution and controls the motor or motors accordingly, as described in DE 102 15 026 A, whose disclosure is incorporated by reference. When laying long straw, the guide vanes 90 enable a swath of equal height across the width of the swath to be generated, or the swath width to be adjusted. During chopping operation, they enable a uniform loading of the straw chopper 74 across the width of the chopper.

Having described the illustrated embodiment, it will become apparent that various modifications can be made without departing from the scope of the invention as defined in the accompanying claims.

The invention claimed is:

1. A combine having an axial separator, a straw chopper, a discharge beater for propelling crop material discharged from the axial separator into the straw chopper, and a straw guiding device arranged between the discharge beater and the straw chopper, characterized by:

the straw guiding device comprises first and second pivotal flaps, the second flap being positioned adjacent the straw chopper and is pivotal to a first position between the straw chopper the crop material and blocking flow of crop material into the straw chopper and to a second position permitting flow of crop material into the straw chopper, and the first flap being positioned adjacent the discharge beater and is pivotal to a first position directing flow of crop material from the discharge beater towards the second flap and pivotal to a second position permitting crop material to flow out of the combine without being processed by the straw chopper.

2. The combine of claim 1, wherein:
the combine has a direction of travel and each flap pivots about a horizontal axis which is transverse to the direction of travel.

3. The combine of claim 1, wherein:
the straw chopper has an inlet; and
the second flap covers the inlet when the second flap is in its first position, and the second flap opens access to the inlet when the first flap is in its first position.

4. The combine of claim 3, wherein:
the second flap can pivot backwards and upwards from its first position into its second position.

5. The combine of claim 1, wherein:
discharge beater has an outlet; and
the second flap has a pivot axis which is located behind and above the outlet of the discharge beater.

6. The combine of claim 1, wherein:
the second flap has a concave curvature.

7. The combine of claim 1, wherein:
the discharge beater is provided with a discharge plate having a downstream end; and
the first flap is arranged at the downstream end of the discharge plate.

8. The combine of claim 7, wherein:
the discharge plate includes adjustable guide vanes for engaging crop material propelled by the discharge beater.

9. The combine of claim 1, wherein:
the discharge beater is provided with a discharge plate having a downstream end; and
the discharge plate is provided with adjustable guide vanes for engaging crop material propelled by the discharge beater.

10. A combine having an axial separator, a straw chopper, a discharge beater for propelling crop material discharged from the axial separator into the straw chopper, and a straw guiding device arranged between the discharge beater and the straw chopper, characterized by:
the straw guiding device comprises first and second pivotal flaps, the second flap being positioned adjacent the straw chopper and is pivotal to a first position blocking flow of crop material into the straw chopper and to a second position permitting flow of crop material into the straw chopper, and the first flap being positioned adjacent the discharge beater and is pivotal to a first position directing flow of crop material from the discharge beater towards the second flap and pivotal to a second position permitting crop material to flow out of the combine without being processed by the straw chopper, the straw chopper having an inlet, and the second flap covers the inlet when the second flap is in its first position, and the second flap opens access to the inlet when the first flap is in its first position.

11. A combine having an axial separator, a straw chopper, a discharge beater for propelling crop material discharged from the axial separator into the straw chopper, and a straw guiding device arranged between the discharge beater and the straw chopper, characterized by:
the straw guiding device comprises first and second pivotal flaps, the second flap being positioned adjacent the straw chopper and is pivotal to a first position blocking flow of crop material into the straw chopper and to a second position permitting flow of crop material into the straw chopper, and the first flap being positioned adjacent the discharge beater and is pivotal to a first position directing flow of crop material from the discharge beater towards the second flap and pivotal to a second position permitting crop material to flow out of the combine without being processed by the straw chopper, discharge beater having an outlet, and the second flap having a pivot axis which is located behind and above the outlet of the discharge beater.

12. A combine having an axial separator, a straw chopper, a discharge beater for propelling crop material discharged from the axial separator into the straw chopper, and a straw guiding device arranged between the discharge beater and the straw chopper, characterized by:
the straw guiding device comprises first and second pivotal flaps, the second flap being positioned adjacent the straw chopper and is pivotal to a first position blocking flow of crop material into the straw chopper and to a second position permitting flow of crop material into the straw chopper, and the first flap being positioned adjacent the discharge beater and is pivotal to a first position directing flow of crop material from the discharge beater towards the second flap and pivotal to a second position permitting crop material to flow out of the combine without being processed by the straw chopper;
the discharge beater having a discharge plate having a downstream end;
the discharge plate including adjustable guide vanes for engaging crop material propelled by the discharge beater; and
the first flap is arranged at the downstream end of the discharge plate.

13. A combine having an axial separator, a straw chopper, a discharge beater for propelling crop material discharged from the axial separator into the straw chopper, and a straw guiding device arranged between the discharge beater and the straw chopper, characterized by:
the straw guiding device comprises first and second pivotal flaps, the second flap being positioned adjacent the straw chopper and is pivotal to a first position blocking flow of crop material into the straw chopper and to a second position permitting flow of crop material into the straw chopper, and the first flap being positioned adjacent the discharge beater and is pivotal to a first position directing flow of crop material from the discharge beater towards the second flap and pivotal to a second position permitting crop material to flow out of the combine without being processed by the straw chopper, the discharge beater having a discharge plate having a downstream end, and the discharge plate having adjustable guide vanes for engaging crop material propelled by the discharge beater.

* * * * *